United States Patent [19]
Gilbert et al.

[11] Patent Number: 5,292,070
[45] Date of Patent: Mar. 8, 1994

[54] APPARATUS FOR THE INTEGRAL SPRINKLING OF LIQUIDS LADEN WITH SOLID MATERIALS IN SUSPENSION

[76] Inventors: David Gilbert, 43, Rue Descartes, 33000 Bordeaux; David Bruno, Residence La Bergerie, Bt. Berry - Appt. 130, Rue Marechal Foch, 33500 Carbon Blanc, both of France

[21] Appl. No.: 909,246

[22] Filed: Jul. 6, 1992

[30] Foreign Application Priority Data

Jul. 5, 1991 [FR] France ............................. 91 08705

[51] Int. Cl.⁵ .................................................. B05B 3/00
[52] U.S. Cl. ................................. 239/232; 239/236; 239/506; 239/515; 239/518
[58] Field of Search ............... 239/225.1, 231, 232, 239/236, 288.5, 506, 513-515, 518; 222/526, 533

[56] References Cited

U.S. PATENT DOCUMENTS

| | | | |
|---|---|---|---|
| 1,510,175 | 6/1923 | Kinnear | 239/288.5 |
| 4,277,029 | 7/1981 | Robitsch | 239/236 X |

FOREIGN PATENT DOCUMENTS

| | | |
|---|---|---|
| 433265 | 4/1939 | Belgium . |
| 0315555 | 5/1989 | European Pat. Off. . |
| 2404473 | 4/1979 | France . |

Primary Examiner—Andres Kashnikow
Assistant Examiner—Lesley D. Morris
Attorney, Agent, or Firm—Richard M. Goldberg

[57] ABSTRACT

The subject matter of the invention is an apparatus for the integral sprinkling of liquids laden with solid materials in suspension of appropriate granulometry, such as a blanket of marc in wine-making, contained in a vat having a vertically movable cone (1) disposed at the bottom part (8) of a return pipe (2a) of constant section on which it slides by means of a sleeve (3) and is held by means of an arm (23) provided with a projection (4) resting on the periphery (5a) of a cam (5) affixed to a shaft (6) connected to a variable-speed electric motor (7) so that, during the continuous rotation of the motor (7) the cone (1) will be positioned at variable heights with respect to the bottom part (8) of the pipe (2) in order to sprinkle the surface integrally with the liquid, and to distribute a quantity of liquid in a uniform manner at any point on the blanket.

20 Claims, 1 Drawing Sheet

APPARATUS FOR THE INTEGRAL SPRINKLING OF LIQUIDS LADEN WITH SOLID MATERIALS IN SUSPENSION

Background of the Invention

The present invention relates to an apparatus for the integral sprinkling of liquids laden with solid materials in suspension of appropriate granulometry, such as the blanket of marc during wine-making, contained in a generally cylindrical or oblong vat having a central or off-center chimney.

Various sprinkling apparatus are known, for sprinkling liquids laden with materials in suspension of appropriate granulometry, such as the floating blanket of marc in wine-making, particularly the apparatus described by French Patent 2,622,895 in the name of the applicants. The procedure consists in draining off the liquid contained in the lower part of the vat and, after pumping it up again, spreading it by means of a movable cone disposed coaxially with respect to the lower end of the feeding tube. The sprinkling diameter is varied by varying the distance between the cone and the bottom end of the feed tube, the variation being obtained by a jack. This type of spreader has a disadvantage as regards the distribution of the sprinkling liquid. The distribution is not uniform on account of the raising and lowering of the cone, which is performed in a continuous and linear manner in order to alleviate the phenomenon known as "pile-up." This sprinkling is irregular as regards the quantity of liquid spread on the surface at any point, and this creates preferential routes of travel of the liquid through the blanket.

French Patent 2,404,473 furthermore discloses the sprinkling of the marc by means of a vane wheel disposed in front of the orifice through which the liquid fed into the vat is discharged, the vane wheel being driven in rotation by means of a turbine driven by the liquid itself, or by means of an electric motor and a shaft. In order to sprinkle the entire surface of the blanket of marc it is necessary to vary the speed of the vane wheel, which is difficult if the wheel is rotated by a turbine which itself is operated by the liquid, and also if the wheel is driven by a shaft and an electric motor since the speed of the motor has to be varied in steps, and this involves the same problem as set forth above. The same is the case with the idea of the wheel having vanes of different diameters, where the result is quite mediocre.

OBJECTS AND SUMMARY OF THE INVENTION

It is the purpose of the invention to remedy the difficulties explained above.

The subject matter of the invention is an apparatus for sprinkling liquids laden with solid matter of appropriate granulometry in suspension, contained in a vat, such as the blanket of marc in wine-making, by means of a hollow cone that can be moved vertically, for a vat having a central chimney, or for a vat having an off-center chimney, by a hinged flap valve disposed at the bottom end of the feed tube of constant section, the variation of the height of the cone or the oscillation of the flap valve being obtained in a variable and continuous manner by means of a rotating cam or, depending on the diameter or size of the vat, by means of a jack.

BRIEF DESCRIPTION OF THE DRAWINGS

Other features and advantages of the invention will be further explained in in the following description, in conjunction with the appended drawings given by way of non-restrictive example, wherein.

DETAILED DESCRIPTION OF THE PREFERRED EMBODIMENTS

Figure 1:
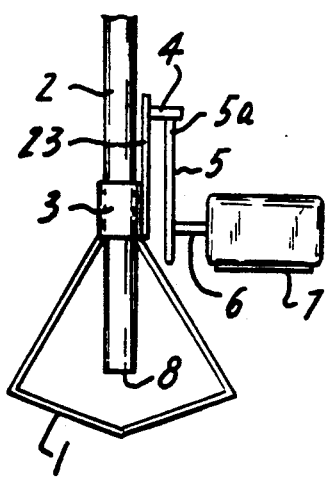
FIG. 1 is a side elevational view of the sprinkling apparatus using a cone, the latter being in the raised position.
Figure 2:
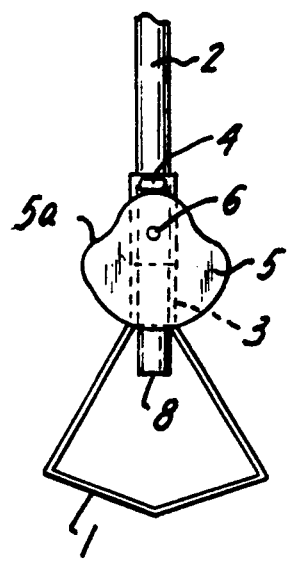
FIG. 2 is a front elevational view of the cone represented in FIG. 1 in the lowered position.

As represented in FIGS. 1 and 2, the cone 1, disposed at the bottom 8 of the return pipe 2 of constant section on which it slides by means of a sleeve 3, is held a desired level by means of an arm 23 provided with a projection 4 resting on the periphery 5a of a cam 5. Cam 5 is affixed to a shaft 6 connected to a constant-speed or variable-speed electric motor 7, so that during the continual rotation of the motor 7 and hence of the cam 5, the latter positions the cone 1 at variable heights with respect to the bottom 8 of the pipe 2 of constant section, for the purpose of fully sprinkling the surface of the blanket of marc contained in the vat, depending on the discharge pressure of the returned liquid and on the contour 5a of the cam 5 which permits the level of the cone 1 to vary continuously according to the variable cycles. Thus, the blanket of marc will receive a uniform amount of liquid at any point on its surface, so as to minimize the preferential routes of travel of the liquid through the marc blanket.

Figure 3:
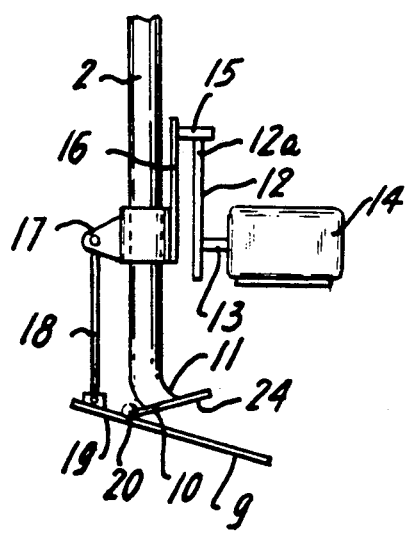
FIG. 3 is a side elevational view of the sprinkling apparatus using a flap valve installed on an off-center vat chimney and driven by a cam.

According to FIG. 3, in the case of off-center vat chimneys, the sprinkling and the spreading of the liquid returned to the blanket of marc are obtained by means of a flap valve 9 hinged at 20 at the bottom part 10 of the return pipe 2 of constant section, the bottom part 10 being in prolongation of the pipe 2 or having an elbow 11 as represented, and the cut of the end of the bottom part 10 is horizontal or at an angle that can vary by 0° to 20°, as represented, this adaptation being defined according to the diameter of the vat and the area to be sprinkled. Variation of the sprinkling area is obtained by the oscillation of the valve 9 which blocks or frees the bottom part 10 of the pipe 2. The variation of the angle of the opening is obtained as described above by means of the appropriate contour of a cam 12 affixed to a shaft 13 connected to a constant-speed or variable-speed electric motor 14. A projection 15 attached to an arm 16 connected to a sleeve 17 sliding on the pipe 2 rests against the contour 12a of the cam 12. A rod 18 of adjustable height is connected between sleeve 17 and the heel 19 of the flap valve 9 which is fulcrumed at 20 to the bottom of the pipe 2.

Figure 4:
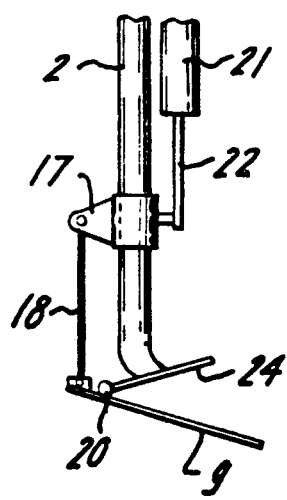
FIG. 4 shows the sprinkling apparatus represented in FIG. 3, wherein the sprinkling flap valve is positioned by means of a jack.
Figure 5:
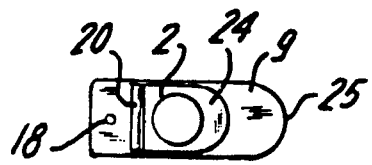
FIG. 5 is a plan view of a rectangular flap valve with one of the sides rounded.

Without departing from the scope of the invention, the oscillation of the flap valve 9 can be obtained advantageously by means of a jack 21, as represented in FIG. 4, the movement of the plunger 22 of the said jack 21 being performed progressively in timed steps or by an electronic varying means in order to distribute the liquid as uniformly as possible over the surface of the blanket of marc. At the bottom 10 of the pipe 2 is a plate 24 having an ovoid contour like the flap valve 9 in order to distribute the sprinkling liquid according to the cross section of the vat. As represented in FIG. 5, the flap valve 9 can have a rectangular shape with the end 25 opposite the fulcrum 20 rounded.

We claim:

1. Apparatus for the integral sprinkling of liquids laden with solid materials of appropriate granulometry in suspension and contained in a vat, with the liquid contained in the vat, comprising:

return pipe means for returning liquid which has been taken from the vat, back to the vat with a substantially constant pressure;

movable diffusion means for diffusing the liquid returned to the vat by said return pipe means, said diffusion means being movable with respect to said return pipe means; and moving means for:
   repeatedly moving said diffusion means in predetermined cycles of movement with respect to said return pipe means, and
   varying the times that the diffusion means remains at different positions relative to the return pipe means during each cycle,
   so as to diffuse a substantially constant quantity of liquid at any surface position of the vat.

2. Apparatus according to claim 1, wherein said moving means includes:

a sleeve slidably mounted on said return pipe means, with said diffusion means being connected with said sleeve;

a cam follower connected with said sleeve;

rotary cam means for:
   repeatedly moving said cam follower, and thereby said diffusion means in said predetermined cycles of movement with respect to said return pipe means; and
   varying the times that the diffusion means remains at different positions relative to the return pipe means during each cycle; and motor means for rotating said cam means to cause said cam means to move said cam follower and thereby said diffusion means to uniformly distribute the liquid from said return pipe means in said vat.

3. Apparatus according to claim 2, wherein said return pipe means has a lower end, and said diffusion means includes a flap valve pivotally connected to the lower end of said return pipe means, such that rotation of said cam means causes said flap valve to repeatedly oscillate in said predetermined cycles of movement with respect to the lower end of said return pipe means, to variably open and close said lower end of said return pipe means.

4. Apparatus according to claim 3, wherein said flap valve includes a heel, and said moving means includes rod means for connecting the heel of said flap valve to said sleeve.

5. Apparatus according to claim 3, wherein said vat has a diameter, and said lower end of said return pipe means is angled in the range of approximately 0° to 20° in dependence upon the diameter of the vat and the area in the vat to be sprinkled with said liquid.

6. Apparatus according to claim 1, wherein said return pipe means has a lower end through which the liquid is returned back to the vat;

said diffusion means includes a flap valve pivotally connected to the lower end of said return pipe means to variably open and close the lower end of said return pipe means; and said moving means includes jack means for causing said flap valve to repeatedly oscillate in said predetermined cycles of movement with respect to the lower end of said return pipe means so as to vary the times that the flap valve remains at different positions relative to the return pipe means during each cycle.

7. Apparatus according to claim 6, wherein said jack means includes a reciprocable plunger;

said moving means includes a sleeve slidably mounted on said return pipe means, said sleeve being connected to said plunger for movement along said return pipe means by actuation of said jack means;

said flap valve includes a heel; and said moving means includes rod means for connecting the heel of said flap valve to said sleeve such that movement of said plunger of said jack means causes said flap valve to repeatedly oscillate in said predetermined cycles of movement with respect to the lower end of said return pipe means so as to vary the times that the flap valve remains at different positions relative to the return pipe means during each cycle.

8. Apparatus according to claim 7, wherein said vat has a diameter, and said lower end of said return pipe means is angled in the range of approximately 0° to 20° in dependence upon the diameter of the vat and the area in the vat to be sprinkled with 9. Apparatus according to claim 7, further including plate means, positioned at the lower end of said return pipe means, for distributing the liquid from the lower end of said return pipe means in accordance with a cross-section of said vat.

10. Apparatus according to claim 2, wherein said cam follower includes a projection fixed to said sleeve and riding on an outer surface of said cam means; and said moving means further includes arm means for fixedly connecting said projection of said cam follower to said sleeve.

11. Apparatus according to claim 2, wherein said return pipe means has a lower end through which the liquid is returned back to the vat, and said diffusion means includes a diffusion cone which is vertically movable with respect to said lower end of said return pipe means.

12. Apparatus for the integral sprinkling of liquids laden with solid materials of appropriate granulometry in suspension and contained in a vat having a central chimney, with the liquid contained in the vat, comprising:

return pipe means for returning liquid which has been taken from the vat, back to the vat with a substantially constant diffusion pressure, said return pipe means having a substantially constant cross-sectional diameter and a lower end through which the liquid is returned back to the vat;

diffusion cone means for diffusing the liquid returned to the vat by said return pipe means, said diffusion cone means being movable with respect to the lower end of said return pipe means, in an axial direction of said return pipe means;

rotary cam means for variably and repeatedly moving said diffusion cone means in predetermined cycles of movement, in the axial direction of said return pipe means; and motor means for driving said rotary cam means, such that said rotary cam means causes said diffusion cone means to uniformly distribute a quantity of said liquid at any point in the vat.

13. Apparatus according to claim 12, further including:

a sleeve slidably mounted on said return pipe means, with said diffusion cone means being fixed to said sleeve;

a cam follower including a projection riding on an outer surface of said cam means; and arm means for fixedly connecting said projection of said cam follower to said sleeve.

14. Apparatus for the integral sprinkling of liquids laden with solid materials of appropriate granulometry in suspension and contained in a vat having an off-central chimney, with the liquid contained in the vat, comprising:

return pipe means for returning liquid which has been taken from the vat, back to the vat with a substantially constant diffusion pressure, said return pipe means having a substantially constant cross-sectional diameter and a lower end through which the liquid is returned back to the vat;

flap valve means for diffusing the liquid returned to the vat by said return pipe means, said flap valve means being pivotally connected to the lower end of said return pipe means about a pivot point; and moving means for:
repeatedly oscillating said flap valve means about said pivot point in predetermined cycles of movement with respect to said return pipe means, and varying the times that the flap valve means remains at different positions relative to the return pipe means during each cycle, to cause said flap valve means to variably open and close the lower end of said return pipe means, so as to diffuse a substantially constant quantity of liquid at any surface position of the vat.

15. Apparatus according to claim 14, wherein said moving means includes rotary cam means for repeatedly oscillating said flap valve means about said pivot point in said predetermined cycles of movement with respect to said return pipe means and for varying the times that the flap valve means remains at different positions relative to the return pipe means during each cycle.

16. Apparatus according to claim 15, wherein said flap valve means includes a heel and said moving means includes:

a sleeve slidably mounted on said return pipe means;

rod means for connecting the heel of said flap valve means to said sleeve;

a cam follower including a projection riding on an outer surface of said cam means;

arm means for fixedly connecting said projection of said cam follower to said sleeve; and motor means for driving said rotary cam means.

17. Apparatus according to claim 14, wherein said moving means includes jack means for repeatedly oscillating said flap valve means about said pivot point in said predetermined cycles of movement with respect to said return pipe means and for varying the times that the flap valve means remains at different positions relative to the return pipe means during each cycle.

18. Apparatus according to claim 17, wherein
said flap valve means includes a heel;
said moving means includes:

a sleeve slidably mounted on said return pipe means, and rod means for connecting the heel of said flap valve means to said sleeve; and said jack means includes a reciprocable plunger connected with said sleeve to cause said sleeve to move along said return pipe means by actuation of said jack means and to thereby cause said flap valve means to repeatedly oscillate about said pivot point in said predetermined cycles of movement with respect to said return pipe means and for varying the times that the flap valve means remains at different positions relative to the return pipe means during each cycle.

19. Apparatus according to claim 14, wherein said vat has a diameter, and said lower end of said return pipe means is angled in the range of approximately 0° to 20° in dependence upon the diameter of the vat and the area in the vat to be sprinkled with said liquid.

20. Apparatus according to claim 14, further including a plate positioned at the lower end of said return pipe means.

* * * * *

UNITED STATES PATENT AND TRADEMARK OFFICE
CERTIFICATE OF CORRECTION

PATENT NO. : 5,292,070
DATED      : March 8, 1994
INVENTOR(S) : David Gilbert and David Bruno It is certified that error appears in the above-identified patent and that said Letters Patent is hereby corrected as shown below:

Column 4, line 35, after "with" insert --said liquid.--

Signed and Sealed this

Twelfth Day of July, 1994

Attest:

BRUCE LEHMAN

*Attesting Officer*    *Commissioner of Patents and Trademarks*